(12) United States Patent
Mohri et al.

(10) Patent No.: US 8,527,273 B2
(45) Date of Patent: *Sep. 3, 2013

(54) SYSTEMS AND METHODS FOR DETERMINING THE N-BEST STRINGS

(75) Inventors: Mehryar Mohri, New York, NY (US); Michael Dennis Riley, New York, NY (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/562,022

(22) Filed: Jul. 30, 2012

(65) Prior Publication Data
US 2012/0296648 A1 Nov. 22, 2012

Related U.S. Application Data

(63) Continuation of application No. 10/301,098, filed on Nov. 21, 2002, now Pat. No. 8,234,115.

(60) Provisional application No. 60/369,109, filed on Mar. 29, 2002.

(51) Int. Cl.
*G10L 15/00* (2006.01)
*G10L 15/14* (2006.01)
*G10L 15/18* (2006.01)

(52) U.S. Cl.
USPC .......... 704/255; 704/251; 704/232; 704/258; 704/257; 704/259

(58) Field of Classification Search
USPC .................. 704/232, 240, 242, 251, 255–258
See application file for complete search history.

(56) References Cited

U.S. PATENT DOCUMENTS

| | | | | |
|---|---|---|---|---|
| 5,450,598 A | * | 9/1995 | Kaplan et al. | 715/201 |
| 5,477,451 A | * | 12/1995 | Brown et al. | 704/9 |
| 5,495,409 A | | 2/1996 | Kanno | |
| 5,510,981 A | * | 4/1996 | Berger et al. | 704/2 |
| 5,737,621 A | | 4/1998 | Kaplan et al. | |

(Continued)

OTHER PUBLICATIONS

A Buchsbaum et al., "on the Determinization of Weighted Finite Automata," in Proc. 25th ICALP, Aalborg, Denmark, 1998, pp. 1-12.

(Continued)

*Primary Examiner* — Pierre-Louis Desir
*Assistant Examiner* — Abdelali Serrou

(57) ABSTRACT

Systems and methods for identifying the N-best strings of a weighted automaton. A potential for each state of an input automaton to a set of destination states of the input automaton is first determined. Then, the N-best paths are found in the result of an on-the-fly determinization of the input automaton. Only the portion of the input automaton needed to identify the N-best paths is determinized. As the input automaton is determinized, a potential for each new state of the partially determinized automaton is determined and is used in identifying the N-best paths of the determinized automaton, which correspond exactly to the N-best strings of the input automaton.

20 Claims, 4 Drawing Sheets

(56) References Cited

U.S. PATENT DOCUMENTS

| | | | |
|---|---|---|---|
| 5,805,832 A * | 9/1998 | Brown et al. | 711/1 |
| 5,806,032 A * | 9/1998 | Sproat | 704/255 |
| 6,018,736 A * | 1/2000 | Gilai et al. | 704/240 |
| 6,032,111 A * | 2/2000 | Mohri | 704/9 |
| 6,073,098 A * | 6/2000 | Buchsbaum et al. | 704/255 |
| 6,167,377 A * | 12/2000 | Gillick et al. | 704/240 |
| 6,182,039 B1 * | 1/2001 | Rigazio et al. | 704/257 |
| 6,233,544 B1 * | 5/2001 | Alshawi | 704/2 |
| 6,243,679 B1 * | 6/2001 | Mohri et al. | 704/256.8 |
| 6,256,630 B1 * | 7/2001 | Gilai et al. | 1/1 |
| 6,266,634 B1 * | 7/2001 | Buchsbaum et al. | 704/232 |
| 6,278,973 B1 * | 8/2001 | Chung et al. | 704/257 |
| 6,401,060 B1 * | 6/2002 | Critchlow et al. | 704/1 |
| 6,714,905 B1 * | 3/2004 | Chang et al. | 704/9 |
| 6,823,307 B1 * | 11/2004 | Steinbiss et al. | 704/252 |
| 6,952,667 B2 * | 10/2005 | Kempe | 704/9 |
| 6,959,273 B2 * | 10/2005 | Kempe | 704/9 |
| 6,990,445 B2 * | 1/2006 | Ky | 704/235 |
| 8,234,115 B2 | 7/2012 | Mohri et al. | |

OTHER PUBLICATIONS

Mohri, et al., "Weighted Finite-State Transducers in Speech Recognition", Computer Speech and Language, Academic Press, Jan. 2002.

European Search Report dated Nov. 16, 2004 for corresponding European Patent Application No. 03100794.4.

Alfred V. Aho et al, Compilers, Principles, Techniques and Tools, Addision Wesley: Reading, MA, 1986.

Mehrya Mohri, Finite-State Transducers in Language and Speech Processing, Computational Linguistics, vol. 23:2, 1997.

Cyril Allauzen et al., On the Determinizability of Weighted Automata and Transducers, in Proceedings of the Workshop Weighted Automata: Theory and Application (WATA), Dresden, Germany, Mar. 2002.

T. Cormen et al., Introduction to Algorithms, The MIT Press: Cambridge, MA 1992.

European Examination Report dated May 4, 2007 for corresponding European Patent Application No. 03100794.1-2215 (5 pages).

* cited by examiner

| \multicolumn{4}{c}{CONTENTS OF QUEUE S} |
| Time | Pair | Path | Ordering based on Φ + c |
|---|---|---|---|
| 1 | (0',0) | | 0 + 0 = 0 |
| 2 | (1',0.1)<br>(2',0.1) | a through 1'<br>b through 2' | 0.2 + 0.1 = 0.3<br>0.2 + 0.1 = 0.3 |
| 3 | (3',0.3)<br>(2',0.1)<br>(3', 0.5) | a, d through 1'<br>b through 2'<br>a, c through 1' | 0 + 0.3 = 0.3<br>0.3<br>0 + 0.5 = 0.5 |
| 4 | (2',0.1)<br>(3',0.5) | b through 2'<br>a,c through 1' | 0.3<br>0.5 |
| 5 | (3',0.3)<br>(3',0.4)<br>(3', 0.5) | b, d through 2'<br>b, c through 2'<br>a, c through 1' | 0 + 0.3 = 0.3<br>0 + 0.4 = 0.4<br>0.5 |
| 6 | (3',0.4)<br>(3',0.5) | b, c through 2'<br>a, c through 1' | 0.4<br>0.5 |
| 7 | (3',0.5) | a, c through 1' | 0.5 |
| 8 | | | |

Fig. 6

SYSTEMS AND METHODS FOR DETERMINING THE N-BEST STRINGS

CROSS-REFERENCE TO RELATED APPLICATIONS

This application is a continuation of U.S. patent application Ser. No. 10/301,098, filed Nov. 21, 2002, which is currently allowed and claims priority to U.S. Provisional Patent Application Ser. No. 60/369,109, filed on Mar. 29, 2002, both of which are incorporated herein by reference in their entirety.

BACKGROUND OF THE INVENTION

1. The Field of the Invention

The present invention relates to identifying a ranked list of unique hypotheses and more specifically to determining the N-best strings of an automaton. More particularly, the present invention relates to systems and methods for determining the N-best distinct strings of a weighted automaton through partial determinization of the weighted automaton.

2. The Relevant Technology

A speech recognition system is an example of a computing system that converts real world non-digital type input data into computer-usable digital data and that converts computer digital data into real-world output data. A speech recognition system receives speech from a variety of different sources, such as over the telephone, through a microphone or through another type of transducer. The transducer converts the speech into analog signals, which are then converted to a digital form by the speech recognition system. From the digital speech data, the speech recognition system generates a hypothesis of the words or sentences that were contained in the speech. Unfortunately, speech recognition systems are not always successful at recognizing speech.

In order to improve the likelihood of correctly recognizing the speech, speech recognition systems generally try to make a best guess or hypothesis using statistical probabilities. In fact, speech recognition systems often generate more than one hypothesis of the words that make up the speech. In one example, the various hypotheses are arranged in a lattice structure such as a weighted automaton, where the weight of the various transitions in the automaton correlate to probabilities.

The weighted automaton or graph of a particular utterance thus represents the alternative hypotheses that are considered by the speech recognition system. A particular hypothesis or string in the weighted automaton can be formed by concatenating the labels of selected transitions that form a complete path in the weighted automaton (i.e. a path from an initial state to one of the final states). The path in the automaton with the lowest weight (or cost) typically corresponds to the best hypothesis. By identifying more than one path, some speech recognition systems are more likely to identify the correct string that corresponds to the received speech. Thus, it is often desirable to determine not just the string labeling a path of the automaton with the lowest total cost, but it is desirable to identify the N-best distinct strings of the automaton.

The advantage of considering more than one hypothesis (or string) is that the correct hypothesis or string has a better chance of being discovered. After the N-best hypotheses or paths have been identified, current speech recognition systems reference an information source, such as a language model or a precise grammar, to re-rank the N-best hypotheses. Alternatively, speech recognition systems may employ a re-scoring methodology that uses a simple acoustic and grammar model to produce an N-best list and then to reevaluate the alternative hypotheses using a more sophisticated model.

One of the primary problems encountered in evaluating the N-best hypotheses is that the same string is often present multiple times. In other words, the automaton or word lattice often contains several paths that are labeled with the same sequence. When the N-best paths of a particular automaton are identified, the same label sequence may be present multiple times. For this reason, current N-best path methods first determine the k ($k \gg N$) shortest paths. After the k shortest paths have been identified, the system is required to perform the difficult and computationally expensive task of removing redundant paths in order to identify the N-best distinct strings. Thus, a large number of hypotheses are generated and compared in order to identify and discard the redundant hypotheses. Further, if k is chosen too small, the N-best distinct strings will not be identified, but rather some number less than N.

The problem of identifying the N-best distinct strings, when compared to identifying the N-best paths of a weighted automaton, is not limited to speech recognition. Other systems that use statistical hypothesizing or lattice structures that contain multiple paths, such as speech synthesis, computational biology, optical character recognition, machine translation, and text parsing tasks, also struggle with the problem of identifying the N-best distinct strings.

BRIEF SUMMARY OF THE INVENTION

These and other limitations are overcome by the present invention, which relates to systems and methods for identifying the N-best strings of a weighted automaton. One advantage of the present invention is that redundant paths or hypotheses are removed before, rather than after, the N-best strings are found. This avoids the problematic enumeration of redundant paths and eliminates the need to sort through the N-best paths to identify the N-best distinct strings.

Determining the N-best strings begins, in one embodiment, by determining the potential of each state of an input automaton. The potential represents a distance or cost from a particular state to the set of end states. Then, the N-best paths are found in the result of an on-the-fly weighted determinization of the input automaton. Only the portion of the input automaton needed to identify the N-best distinct strings is determinized.

Weighted determinization is a generalization of subset construction to create an output automaton such that the states of the output automaton or the determinized automaton correspond to weighted subsets of pairs, where each pair contains a state of the input automaton and a remainder weight. Transitions that interconnect the states are created and given a label and assigned a weight. The destination states of the created transitions also correspond to weighted subsets. Because the computation of the transition(s) leaving a state only depends on the remainder weights of the subsets of that state and on the input automaton, it is independent of previous subsets visited or constructed. Thus, the only portion of the input automaton that is determinized is the portion needed to identify the N-best strings. The potential or shortest distance information is propagated to the result of determinization.

An N-shortest path method that utilizes the potential propagated to the result of determinization can be used to find the N-best paths of the determinized automaton, which correspond with the N-best distinct strings of the input automaton. Advantageously, the determinized automaton does not need to be entirely expanded and/or constructed.

Additional features and advantages of the invention will be set forth in the description which follows and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 6 illustrates the contents of a queue S for a specific example at various times during an N-best path algorithm.

DETAILED DESCRIPTION OF THE PREFERRED EMBODIMENTS

Weighted directed graphs such as automata are used in a variety of different technologies, such as speech recognition, speech analysis, optical character recognition, text parsing, machine translation, and the like. A weighted automaton may represent multiple hypotheses of a probabilistic process such as those set forth above. The present invention relates to identifying or determining the N-best distinct strings of the automata and is applicable in these and other areas.

One advantage of the present invention is that the redundant paths are removed prior to determining the N-best paths. Because the redundant paths are removed prior to the N-best search, the N-best paths correspond to the N-best distinct strings. The redundant paths are removed in one embodiment by determinizing the weighted automaton on-the-fly until the N-best strings are identified. Because the redundant paths have already been removed by the partial determinization of the weighted automaton, the N-best path process identifies the N-best strings and the potentially exponential enumeration of redundant paths is avoided. Another advantage of the present invention is that determining the N-best strings does not require complete determinization of the weighted automaton. Only the portion of the automaton visited during the N-best search is determinized. Alternatively, only the portion of the determinized automaton visited during the N-best search is expanded.

Weighted automata are weighted directed graphs in which each edge or transition has a label and a weight. Weighted automata are useful in many contexts as previously described. While the present invention is described in terms of speech recognition, one of skill in the art recognizes the applicability of the present invention to other systems using weighted automata.

Figure 1:
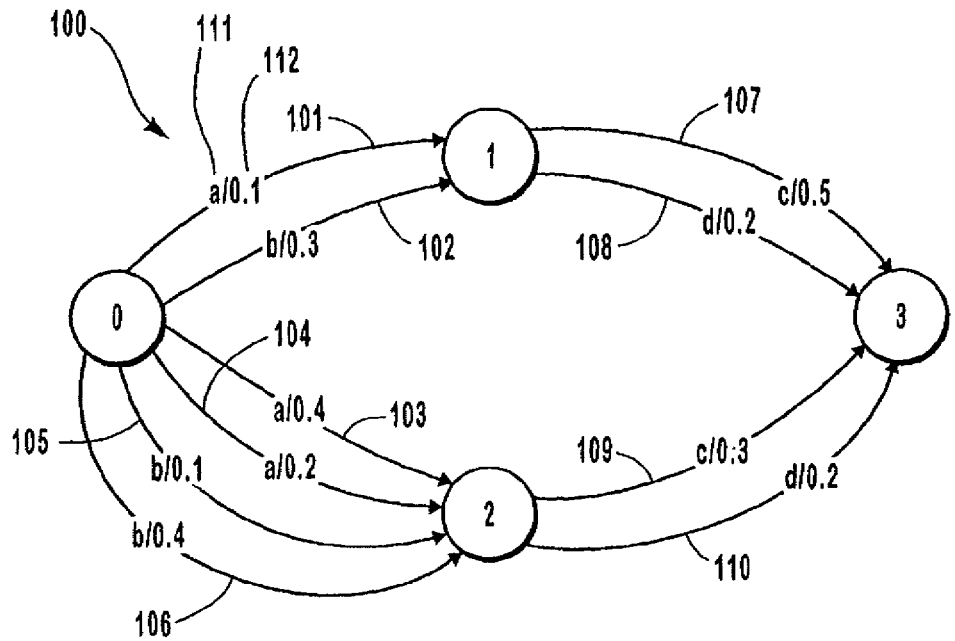
FIG. 1 illustrates a weighted automaton that has not been determinized.

FIG. 1 illustrates an exemplary weighted automata that has been generated, in this example, by a speech recognition system. The automaton 100 includes a beginning state 0, a final state 3 and intermediary states 1 and 2. The states are connected by transitions and each transition has a label and a weight. The label, in the case of a phoneme or word lattice, is usually a phoneme or a word respectively, although the label can represent any type or bit of information. The weight of a transition is often interpreted as the negative log of probabilities, but may correspond to some other measured quantity. The weight of a particular path in the automaton 100 is determined by summing the weights of the transitions in the particular path. In the case of a word automaton, a sentence can be determined by concatenating the labels for each path in the automaton 100.

More specifically in this example, the transitions 101 and 102 connect state 0 with state 1. The transitions 103, 104, 105, and 106 connect state 0 with state 2. The transitions 107 and 108 connect state 1 with state 3, and the transitions 109 and 110 connect state 2 with state 3. Each transition has a label and a weight. For example, the label 111 of the transition 101 is "a" and the weight 112 of the transition 101 is 0.1. The other transitions are similarly labeled.

An automaton is deterministic if it has a unique initial state and if no two transitions leaving the same state share the same input label. The automaton 100 is therefore not deterministic because some of the transitions leaving a particular state have the same label. In FIG. 1, for example, the transitions 101, 103, and 104 all leave state 0 and each transition has the same label "a". The automaton 100, however, can be determinized.

More generally, an automaton A can be weighted over the semiring $(R \cup \{-\infty, +\infty\}, \min, +, \infty, 0)$. Usually, the automaton is generally weighted over the semiring $(R_+ \cup \{\infty\}, \min, +, \infty, 0)$ also known as the tropical semiring. This example uses the weights along the tropical semiring $A=(\Sigma, Q, E, i F, \lambda, =p)$ that are given by an alphabet or label set $\Sigma$, a finite set of states Q, a finite set of transitions $E \subset Q \times \Sigma (R_+ \cup \{\infty\}) \times$, an initial state $i \in Q$, a set of final states $F \subseteq Q$, an initial weight $\lambda$ and a final weight function p.

A transition $e=(p[e], l[e], w[e], n[e]) \in E$ can be represented by an arc from the source or previous state p[e] to the destination or next state n[e], with the label l[e] and weight w[e]. A path in A is a sequence of consecutive transitions $e_1 \ldots e_n$ with $n[e_i]=p[e_{i+1}]$, $i=1, \ldots, n-1$. Transitions labeled with the empty symbol $\epsilon$ consume no input. Denoted are P(R, R'), the set of paths from a subset of states $R \subset Q$ to another subset $R' \subset Q$. A successful path $\pi e_1 \ldots e_n$ is a path from the initial state i to a final state $f \in F$. The previous state and next state for path $\pi$ is the previous state of its initial transition and the next state of its final transition, respectively:

$$p[\pi]=p[e_1], n[\pi]=n[e_n] \qquad (1)$$

The label of the path $\pi$ is the string obtained by concatenating the labels of its constituent transitions:

$$l[\pi]=l[e_1] \ldots l[e_n] \qquad (2)$$

The weight associated to $\pi$ is the sum of the initial weight (if $p[\pi]=i$), the weights of its constituent transitions:

$$w[\pi]=w[e_1]+ \ldots +w[e_n] \qquad (3)$$

and the final weight $p[n[\pi]]$ if the state reached by $\pi$ is final. A symbol sequence x is accepted by A if there exists a successful path $\pi$ labeled with x: $l[\pi]=x$. The weight associated by A to the sequence x is then the minimum of the weights of all the successful paths π labeled with x.

Weighted determinization is a generalization of subset construction. In weighted determinization, a deterministic output automaton is generated from an input automaton. The states of the output automaton correspond to weighted subsets $\{(q_o,w_o), \ldots, (q_n, w_n)\}$ where each $q_i \epsilon Q$ is a state of the input automaton, and $w_i$ a remainder weight. Weighted determinization begins with the subset reduced to $\{(i,0)\}$ and proceeds by creating a transition labeled with $a \epsilon \Sigma$ and weight w leaving $\{q_o,w_o), \ldots, (q_n, w_n)\}$ if there exists at least one state $q_i$ admitting an outgoing transition labeled with a, w being defined by $$w=\min\{w_i+w[e]:e \epsilon E[q_i], l[e]=a\}. \quad (4)$$

The destination state of that transition corresponds to the subset containing the pairs (q', w') with $q' \epsilon \{n[e]:p[e]=q_i, l[e]=a\}$ and the remainder weight $$w'=\min[w_i+w[e]-w:n[e]-w:n[e]=q']. \quad (5)$$

A state is final if it corresponds to a weighted subset S containing a pair (q, w) where q is a final state (qϵF) and in that case its final weight is:

$$w=\min\{w+p[q]:(q, w) \epsilon S, q \epsilon F\}. \quad (6)$$

Figure 2:
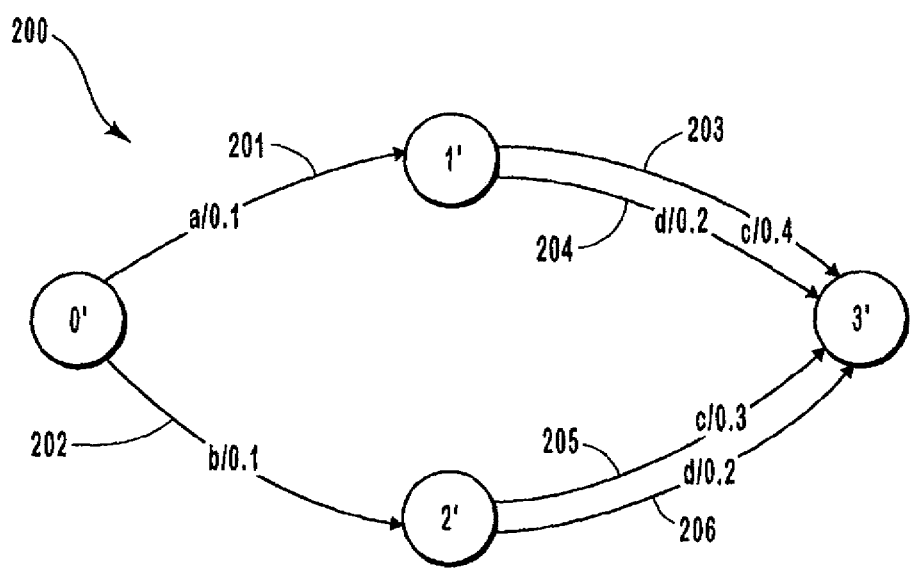
FIG. 2 illustrates a determinized automaton.

FIG. 2 illustrates a determinized automaton 200, which is the automaton 100 after it has been determinized. The determinized automaton 200 includes a start state 0', a final state 3', and intermediate states 1' and 2'. The weighted automaton 200 is deterministic because no two transitions leaving a particular state share the same label.

The following discussion illustrates the determinization of the automaton 100 in FIG. 1 into the automaton 200 of FIG. 2 using the determinization process briefly described previously. The transitions 101, 103, and 104 all leave state 0 and all have the label a. A transition 201 is thus created in the determinized automaton 200 with the label a. The weight assigned to the transition 201 is determined as: $w=\min \{w_i+w[e]:e \epsilon E[q_i], l[e]=a\}$. Applying this definition to the transitions 101, 103, and 104 and taking the minimum results in a weight w of 0.1, which is assigned to the transition 201. Because the transitions 101, 103, and 104 have two destination states (state 1 and state 2) in the automaton 100, the destination state 1' of the determinized automaton 200 for the transition 201 labeled a corresponds to the subsets containing the pairs (q', w') with $q' \epsilon \{n[e]:p[e]=q_i, l[e]=a\}$ and the remainder weight $w'=\min[w_i+w[e]-w:n[e]-w:n[e]=q']$. More specifically, the subset pairs of state 1' are the pairs $\{(1,0), (2,0.1)\}$.

Using a similar procedure for the transitions 102, 105, and 106 results in the transition 202, which is labeled b and has a weight of 0.1. The subset of pairs that correspond to state 2' are $\{(1,0.2),(2,0)\}$. The transitions 203, 204, 205, and 206 are similarly determined. Weighted determinization is more fully described in U.S. Pat. No. 6,243,679 to Mohri et al., which is hereby incorporated by reference.

The computation of the transitions leaving a subset S only depends on the states and remainder weights of that subset and on the input automaton. The computation is independent of the previous subsets visited or constructed and subsequent states that may need to be formed. This is useful because the determinization of the input automaton can be limited to the part of the input automaton that is needed. In other words, the input automaton can be partially determinized or determinized on-the-fly.

Figure 3:
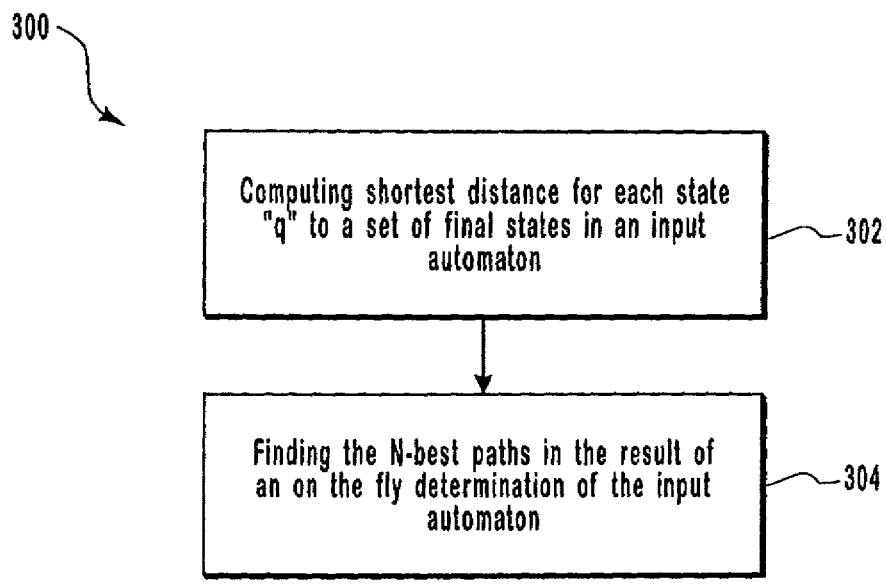
FIG. 3 illustrates a method for finding the N-best distinct strings of an input automaton.

FIG. 3 illustrates an exemplary method for finding the N-best distinct strings of an input automaton. As previously indicated, redundant paths are removed by the present invention such that the N-best paths of the result of determinization correspond to the N-best strings of the input automaton. More specifically with reference to FIGS. 1 and 2, the N-best paths of the automaton 200 correspond to the N-best distinct strings of the automaton 100.

Identifying the N-best strings begins with determining the shortest distance or potential of each state in an input automaton to a set of final states (302) of the input automaton. Then, the N-best paths in the result of an on-the-fly determinization of the input automaton (304) are found. As previously stated, the N-best paths found in the result of the on-the-fly determinization correspond to the N-best distinct strings.

In the input automaton, the shortest distance or potential of each state to a set of final states is given by:

$$\phi[q]=\min\{w/\pi]+p[f]:\pi \epsilon P(q,f), f \epsilon F\}. \quad (7)$$

The potentials or distances $\phi[q]$ can be directly computed by running a shortest-paths process from the final states F using the reverse of the digraph. In the case where the automaton contains no negative weights, this can be computed for example using Dijkstra's algorithm in time O(|E||log|Q|) using classical heaps, or in time O(|E|+|Q||log|Q|) if Fibonacci heaps are used.

As previously stated, the present invention does not require the complete determinization of the input automaton. However, the shortest-distance information of the input automaton is typically propagated to the result of the on-the-fly determinization. Further, the on-the-fly determinized result may be stored for future reference. The potential of each state in the partially determinized automaton is represented by $\Phi(q')$ and is defined as follows:

$$\Phi[q']=\min\{w_i=\phi[q_i]:0 \leq i \leq n\}, \quad (8)$$

where q' corresponds to the subset $\{(q_o,w_o), \ldots, (q_n, w_n)\}$. The potential $\Phi[q']$ can be directly computed from each constructed subset. The potential $\Phi[q']$ or determinized potential can be used to determine the shortest distance from each state to a set of determinized final states within the partially determinized automaton. Thus, the determinized potential can be used in shortest path algorithms. The determinized potential is valid even though the determinized automaton is only partially determinized in one embodiment.

Figure 4:
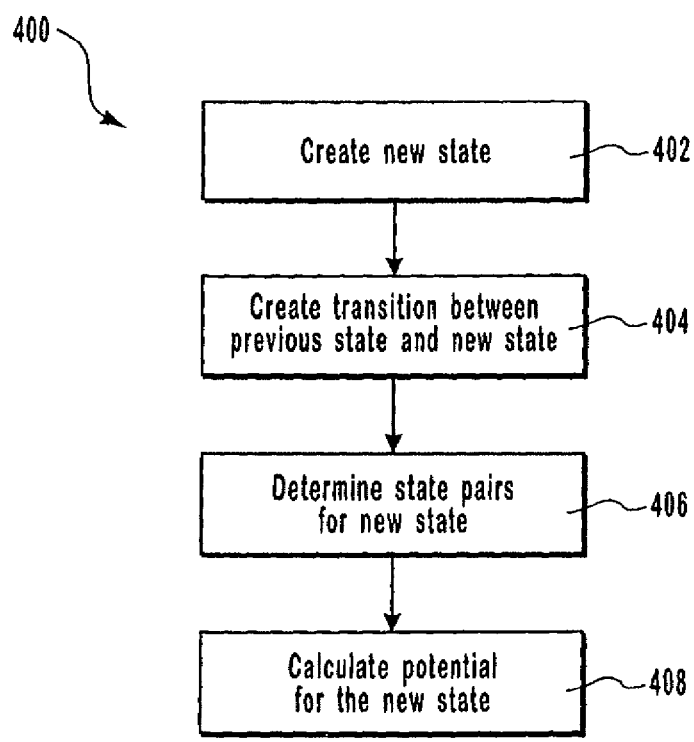
FIG. 4 illustrates a state creation process.

When an automaton is determinized on-the-fly during the N-best search, it is necessary to create new states in the result of on-the-fly determinization as illustrated in FIG. 4. After a new state is created (402), the transition between the previous state and the new state is created (404) as described previously. Next, the pairs of the subset that correspond to the newly created state are determined (406). Finally, the potential for the new state is computed (408). The pairs included in the subset of a determinized state are used in the N-best path method described below.

In general, any shortest-path algorithm taking advantage of the determinized potential can be used to find the N-best paths of the partially determinized automaton, which are exactly labeled with the N-best strings of the input automaton. The following pseudocode is an example of an N-shortest paths algorithm that takes advantage of the determinized potential. This example assumes that the determinized automaton only contains a single final state. This does not affect the generality of the ability to identify the N-best strings because an automaton can always be created by introducing a single final state f to which all previously final states are connected by ϵ-transitions. Note that the states of the determinized automaton are created only as required. The pseudocode is as follows:

```
1  for p ← 1 to [Q'] do r[p] ← 0
2  π[i', 0)] ← NIL
3  S ← {(i', 0)}
4  while S ≠ ∅
5      do (p, c) ← head(S); DEQUEUE(S)
6          r[p] ← r[p] + 1
7          if (r[p] = n and p ∈ F) then exit
8          if r[p] ≦ n
9              then for each e ∈ E[p]
10                 do c' ← c + w[e]
11                     π [n[e], c')] ← (p, c)
12                     ENQUEUE (S, (n [e], c'))
```

Consider pairs (p, c) of a state p∈Q' and a cost c, where Q' is the automaton representing the result of determinization. The process uses a priority queue S containing the set of pairs (p, c) to examine next. The queue's ordering is based on the determinized potential Φ and defined by $$(p,c) < (p',c) \Leftrightarrow (c + \Phi[p] < c' + \Phi[p']) \quad (9)$$

An attribute r[p], for each state p, gives at any time during the execution of the process the number of times a pair (p, c) with state p has been extracted from S. The attribute r[p] is initiated to 0 (line 1) and incremented after each extraction from S (line 6).

Paths are defined by maintaining a predecessor for each pair (p, c) which will constitute a node of the path. The predecessor of the first pair considered (i', 0) is set to NIL at the beginning of each path (line 2). The priority queue S is initiated to the pair containing the initial state i' of Q' and the cost 0.

Each time through the loop of lines 4-12, a pair (p, c) is extracted from S (line 5). For each outgoing transition e of p, a new pair (n[e]c') made of the destination state of e and the cost obtained by taking the sum of c and the weight of e is created (lines 9-10). The predecessor of (n[e], c') is defined to be (p, c) and the new pair is inserted in S (lines 11-12).

The process terminates when the N-shortest paths have been found. For example, the process terminates when the final state of B has been extracted from S N times (lines 7). Since at most N-shortest paths may go through any state p, the search can be limited to at most N extractions of any state p (line 8). By construction, in each pair (p, c), c corresponds to the cost of a path from the initial state i' to p and c+Φ(p) to the cost of that path when completed with a shortest path from p to F. The determinized potential is thus used in the result of determinization. The partially determinized automaton is created on-the-fly as the search for the N-best paths is performed on the partially determinized automaton.

Because the pairs are prioritized within the queue, the order in which new states of the determinized automaton are created is effectively determined by the N-best search. In other words, weighted determinization as described herein depends on the subset of pairs that correspond to a particular state of the determinized automaton and on the potential that is propagated to the determinized automaton. Thus, the N-best search utilizes the propagated potential and the subset of state pairs to determine how the input or original automaton is determinized on-the-fly.

Figure 5:
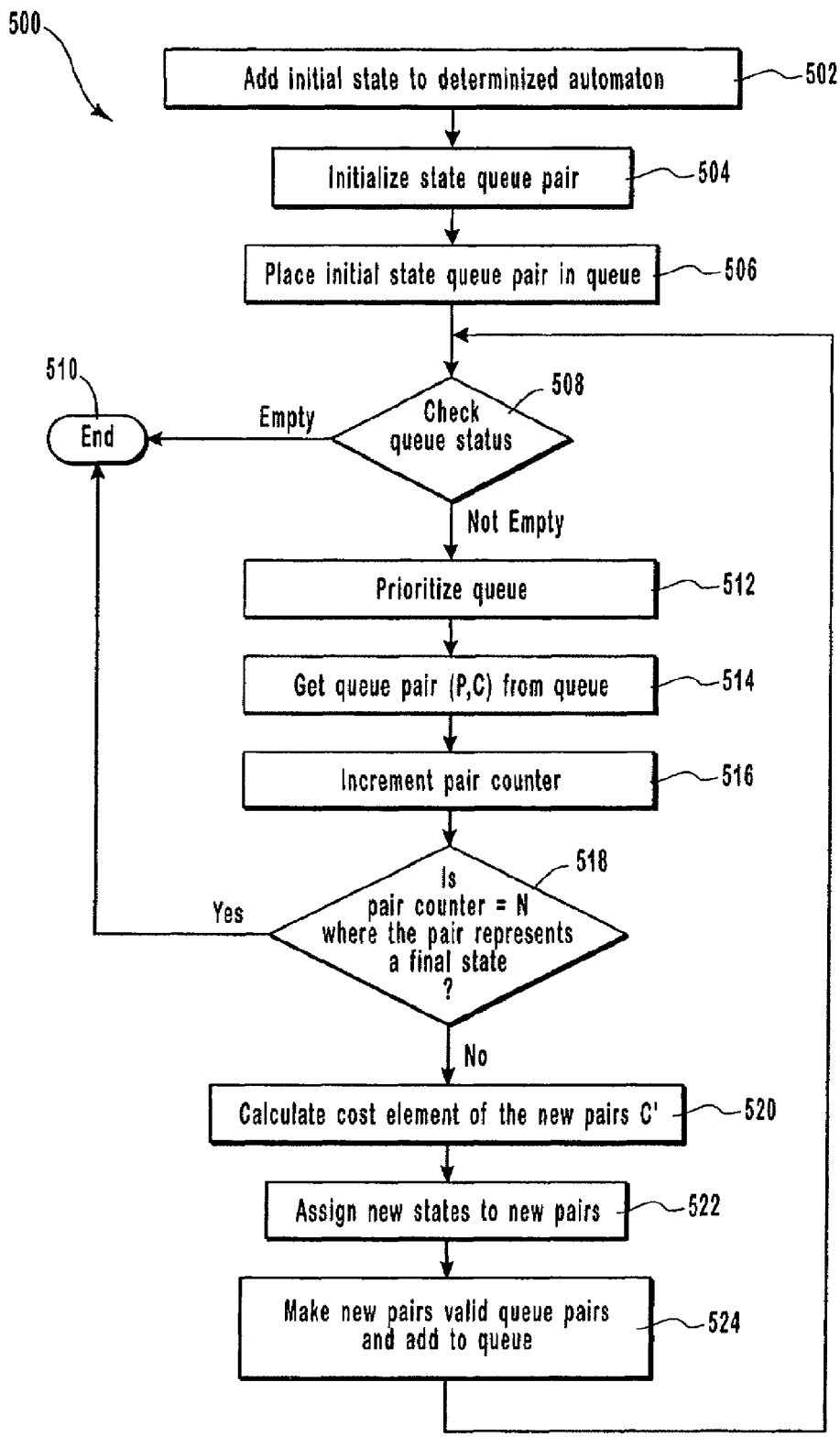
FIG. 5 illustrates an exemplary N-best paths method used to identify the N-best distinct strings of an input automaton.

The following example illustrates on-the-fly determinization with reference to FIGS. 1, 2, 5, and 6. In the present example, the determinized automaton 200 is constructed as the N-best strings are realized as shown in FIG. 5. Identifying the N-best strings of a weighted automaton 100 begins by creation of an initial state that is added to a determinized automaton (502), which is the result of determinizing a particular input automaton such as the automaton 100 shown in FIG. 1. The initial state is given a label of 0'. This initial state is shown on FIG. 2 as state 0'. Next, a state queue pair is initialized (504). Initializing a state pair includes the creation of a first queue pair (0',0) that comprises a state variable that corresponds to the state 0' and an initial cost element of 0. Initialization also sets all of the counters r[p] to 0, where r[p] represents the number of times a particular state has been extracted from the queue.

Next the initial state queue pair created above is placed in a queue S (506). The results of placing the initial state queue pair into the queue are shown in FIG. 6 at a time shown in row 601. At time 1, the contents of the queue are the queue pair (0',0). The pairs or subsets that correspond to a particular state are identified as previously described.

Then the process 500 checks the status of the queue (508). If the queue is empty, the process 500 ends (510). Because the initial queue pair (0,0) has been placed in the queue, the queue is not empty and the process 500 prioritizes the queue (512).

The process 500 then selects the element from the queue with the highest priority (514). At this point in the process the selected pair is (0',0). A pair counter function r[p] associated with state 0' (the first number in the state pair extracted from the queue) is incremented (516). This function r[p] had a value of 0 prior to being incremented, and has a value of 1 after being incremented. However, because state 0 is not a final state, this counter will not indicate how many times a path has reached a final state and is therefore uninteresting for this example. The value of r[p] for the final state is compared to the value N to determine if the N-best paths for the determinized automaton have been realized (518). Because state 0 is not a final state, the process takes the "no" path at 518.

The process 500 then calculates the cost elements of new queue pairs that will be created and added to the queue (520). New cost elements must be calculated for each transition leaving state 0' of the determinized automaton 200. Referring to the input automaton 100, there are two transition labels associated with all of the transitions leaving the initial state 0, namely a and b.

At this point, because it is known that the destination states that transitions a and b will reach in the determinized automaton 200 are needed, they can be created on the determinized automaton 200. A new state labeled 1' is created. As noted above, the states in the determinized automaton comprise weighted subsets $\{(q_o, w_o), \ldots, (q_n, w_n)\}$ where each $q_i \in Q$ is a state of the input machine, and $w_i$ a remainder weight.

A new transition from state 0' to state 1' is created according to the rules set forth above. In the present example, referring to FIG. 1, the transition a leaving state 0 has a weight of 0.1 to destination state 1, and weights of 0.2 and 0.4 to destination state 2. Therefore, the weight of the new transition a formed on the determinized automaton 200 is 0.1. This is true because the remainder weight $w_i$ for the state 0 was defined to be 0 and the smallest weight of the transition w[e] (the weight of the transition to state 1) is 0.1. Note that there are two destination states that transition a could reach in the input automaton, namely 1 and 2. The transition to the newly created transition is labeled a and given a weight of 0.1 as shown by the transition 201 in FIG. 2. Once the weight of the transition a is known, the weight (w') of the weighted subsets that comprise the label of the new state 1' can be calculated. Because there were two paths for the transition a to reach a subsequent state in the input automaton, the new state 1' will have two weighted subsets or pairs. The first weighted subset or pair is (1,0). The first number 1 corresponds to state 1 in the input automaton which was a destination state for the transition a. The second number is calculated by using equation (5) above.

Note however, that there is a second path that transition a could take, namely to state 2 of the input automaton 100. Therefore, a weighted subset of state 1' corresponding to this possible path needs to be created. This weighted subset is (2,0.1). The first number 2 corresponds to the state 2 of the input automaton 100. The second number 0.1 is the weight calculated from equation (5) above.

A similar process is performed for creating transition b to destination state 2' on the determinized automaton 200. Note that using the above process, state 2' has weighted subsets of (2,0) and (1,0.2).

For each of the newly created states, namely 1' and 2', on the determinized automaton, the cost elements for the queue pairs need to be calculated (520). The cost element is dependent on the potential of each of the new states in the determinized automaton. The determinized potential of each state q' is calculated using equation (8) above. This potential represents the shortest path from the current state to the final state in the determinized automaton 200. The determinized potential can be calculated before any final state has actually been created.

The determinized potential for state 1' is 0.2. This is calculated by using the weighted subsets $(q_1, w_1)$ (1,0) and $(q_2, w_2)$ (2,0.1). From above, it is known that the potential of state 1 in the input automaton 100 is 0.2, and the potential of state 2 is 0.2. By equation (8) the potential of state 1' is 0.2. Similarly, the potential for the state 2' is 0.2.

After the potentials have been calculated, the cost elements for new queue pairs can be calculated (520). Calculating cost elements (520) is necessary for creating new pairs that will be inserted into queue S. A new pair must be calculated for every outgoing transition of the determinized automaton 200. In this example, because the first pair from the queue (0',0) is used corresponding to state 0' of the determinized automaton, there are two outgoing transitions, namely a and b. The cost element is the sum of the current cost element plus the weight of the transition leaving the current state. In the current example, this results in two new cost elements, 0+0.1=0.1 for the transition a to state 1' and 0+0.1=0.1 for the transition b to state 2'.

The N-best string process 500 assigns the newly created states, namely 1' and 2', to new queue pairs (522). New queue pairs are created where the first number is a state element that represents a destination state from the state represented by the preceding queue pair previously popped from the queue, and the second number represents the cost calculated above (520). For this example, the new pairs that are created are (1',0.1) and (2',0.1) where 1' represents the destination state of transition a from state 0', 0.1 represents the cost of that transition, 2' represents the destination state of transition b from state 0', and 0.1 represents the cost of that transition.

The newly created queue pairs are made to conform to the queue format and placed in the queue (524). At this point the modified N-best strings process 500 returns to check the status of the queue (508) and because the queue is not empty, the queue is prioritized (512).

Prioritization (512) orders all of the elements in the queue so that based on the queue's ordering, a particular pair will be popped from the queue when the process gets a queue pair from the queue (514). Priority is assigned to each element in the queue according to equation (9).

This equation implies that any pair in the queue whose cost element plus the potential of the state the pair represents is less than any other pair's cost element plus the potential of the state that pair represents is given a higher priority. Using this ordering, the contents of the queue are arranged at this point in our example as shown at a time 2 shown in row 602 of FIG. 6. Note that in this example, the pairs in the queue both have an ordering variable that is equal. In this case, the queue can randomly select either pair. In our example, the pair (1',0.1) has arbitrarily been given higher priority.

The top queue pair is then selected from the queue (514) which is (1',0.1). Again because this pair is not a final state, the N-best strings process 500 flows uninterestingly to a point where the cost elements for subsequent states need to be calculated (520). Because at this point states subsequent to state 1' are needed on the determinized automaton 200, any states to which transitions from state 1' will flow are constructed.

First, a new state 3' is created. Transitions from state 1' to the newly created state 3' are created. In the input automaton 100, the transitions 102 that could be taken after transition a are transitions c and d. Thus, a transition c is created from state 1' to 3'. The weight of this transitions is given by equation (4) above.

For the weighted subset of 1' (1,0), the remainder weight is 0 and the transition weight for path c is 0.5, therefore, $w_r+w[e]=0.6$. For the weighted subset of 1' (2,0.1), the remainder weight is 0.1 and the weight of the transition for path c is 0.3, therefore $w_r+w[e]=0.4$. The minimum of the two above is of course 0.4. Therefore, the transition c from 1' to 3' is 0.4. Using a similar analysis, the weight of the transition d from state 1' to state 3' is 0.4.

Next, weighted subsets for the new state 3' are created. The weighted subset associated with state 3' for path c is (3,0), where 3 is the destination state in the input automaton 100, and 0 is calculated using equation 5 above. Note that because the first element is 3, and 3 was a final state in the input automaton 100, the state 3' is a final state in the determinized automaton 200. The process for path d is similar to the one for c and yields a weighted subset state pair of (3,0). The potential of the new state 3' is then calculated. The potential for state 3' is 0 using the equations for potential above.

The cost elements for all transitions leaving the current state, namely 1', are calculated (520). Using the method described above, the cost for the queue pair representing transition c from state 1' is 0.5. Similarly, the cost element for transition d leaving state 1' is 0.3. New state 3' is then assigned to new queue pairs (522); namely, the queue pairs (3',0.5) and (3',0.3) are created for the transitions c and d respectively from state 1' to 3'. The new queue pairs are then validated and added to the queue S.

The process 500 then returns to check the status of the queue (508) and continues as described above until the N-best paths on the new automaton (or the result of determinization) have been extracted. Note that by looking at the queue at a time 3 shown in row 603 in FIG. 6, the next queue pair to be popped from the queue is a final state pair because 3' is a final state. Therefore, the r[p] variable associated with this state is important because it tells us that a final state has been reached one time. If only the 1 (N=1) best path is needed, it has been found at this point and the modified N-best strings process 500 could end (510). If more than the one best path is desired, then the process would continue until more queue pairs representing the final state had been extracted. Examining the queue in FIG. 6, it can be observed that at the times shown in rows 605, 606, and 607 final states will be popped off of the queue. If the two best paths are needed, the process 500 can be ended after time 5 in row 605. If the three (N=3) best paths are needed, the process 500 can end after a time 6 in row 606, and so forth. Note also that after a time 8 shown in row 608, the process will end when the queue status is checked (508) because the queue is empty.

It should be noted that the above example is just one example of one N-best paths process that may be used. Other N-best paths processes that depend on the value of the potential of a given state may also be used to implement the on-the-fly determinization described above.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for finding N-best distinct hypotheses of an input automaton, the method comprising:
   computing, via a speech recognition system, an input potential for each state of a plurality of states of the input automaton to a set of final states, wherein the input potential of each state is used to determine a determinized potential of the state in a result of determinization of the input automaton and wherein the determinized potential of a particular state in the result of determinization is determined without fully determinizing the input automaton;
   removing redundant paths; and
   identifying N-best distinct paths in the result of determinization of the input automaton using the determinized potential of each of the states in the result of determinization, wherein the N-best distinct paths in the result of determinization comprise more than one best path and are labeled with the N-best hypotheses of the input automaton, wherein the identifying the N-best distinct paths comprises:
      adding an initial state to the result of determinization of the input automaton;
      creating an initialized first queue pair comprising the initial state and an initial cost element;
      placing the first queue pair in a queue;
      creating a plurality of new states from the first queue pair;
      applying a shortest path algorithm to each of the new states to calculate a shortest path of each of the new states;
      creating new queue pairs using the new states and cost elements of each new queue pair calculated via the shortest path algorithm;
      adding the new queue pairs to the queue;
      prioritizing the queue based upon a cost element of each queue pair relative to each other queue pair in the queue, wherein a queue pair in the queue with a lower cost element is given a higher priority than another queue pair in the queue with a higher cost element;
      selecting a queue pair from the queue with a highest priority;
      incrementing a pair counter; and
      determining whether a value of the pair counter is equal to a desired number of best paths.

2. The method of claim 1, wherein the computing the input potential for each state of the input automaton to the set of final states further comprises running a shortest-paths algorithm from the set of final states using a reverse of a digraph.

3. The method of claim 1, wherein the identifying N-best distinct paths in the result of determinization of the input automaton further comprises computing the result of determinization on-the-fly.

4. The method of claim 3, wherein the computing the result of determinization further comprises:
   creating a new state in the result of determinization;
   creating a new transition from a previous state to the new state in the result of determinization, wherein the new transition has a label that is the same as a label from a transition of the input automaton;
   creating a subset of state pairs that correspond to the new state; and
   determining a determinized potential for the new state using an input potential from a state of the input automaton.

5. The method of claim 4, wherein each state pair in the subset of state pairs includes a state from the input automaton and a remainder weight, wherein the creating the subset of state pairs further comprises constructing a state pair for each destination state of the transition in of the input automaton, wherein each state pair for each destination state of the transition of the input automaton includes a state of the input automaton and a remainder weight.

6. The method of claim 4, wherein the creating the new transition from the previous state to the new state in the result of determinization only depends on states and remainder weights of a particular subset corresponding to the previous state in the result of determinization and on the input automaton.

7. The method of claim 1, wherein the identifying N-best distinct paths in the result of determinization of the input automaton using the determinized potential of each of the states in the result of determinization further comprises propagating the input potential of a particular state to states in the result of determinization.

8. A method for identifying the N-best distinct strings of an automaton, the method comprising:
   partially determinizing, via a speech recognition system, the automaton during a search for the N-best distinct strings, wherein the N-best distinct strings comprise more than one best distinct string, by creating a partially determinized automaton while searching for the N-best distinct strings by:
      creating an initial state of in the partially determinized automaton, wherein the initial state corresponds to a state pair;
      creating a transition leaving the initial state, wherein the transition has a label and a weight;
      creating a destination state for that transition, wherein the destination state corresponds to a subset of state pairs;
      creating additional states in the partially determinized automaton, wherein each additional state corresponds to a different subset of state pairs and wherein the additional states in the partially determinized automaton are connected by transitions that have labels and weights; and
      propagating a potential from a state of the automaton to each state in the partially determinized automaton;
   removing redundant paths; and
   identifying the N-best distinct strings of the automaton from the partially determinized automaton using an N-best paths process, wherein the identifying the N-best paths comprises:
      adding an initial state to the partially determinized automaton;
      creating an initialized first queue pair comprising the initial state and an initial cost element;

placing the first queue pair in a queue;
creating a plurality of new states from the first queue pair;
applying a shortest path algorithm to each of the new states to calculate a shortest path of each of the new states;
creating new queue pairs using the new states and cost elements of each new queue pair calculated via the shortest path algorithm;
adding the new queue pairs to the queue;
prioritizing the queue based upon a cost element of each queue pair relative to each other queue pair in the queue, wherein element a queue pair in the queue with a lower cost element is given a higher priority than a queue pair in the queue with a higher cost element;
selecting a queue pair from the queue with a highest priority;
incrementing a pair counter; and
determining whether a value of the pair counter is equal to a desired number of best paths.

9. The method of claim 8, further comprising computing an input potential for each state of the automaton, wherein each input potential represents a shortest distance from a corresponding state to a set of final states.

10. The method of claim 9, wherein the computing the input potential for each state of the automaton further comprises running a shortest-paths algorithm from the set of final states using a reverse of a digraph.

11. The method of claim 8, wherein the identifying the N-best distinct strings of the automaton from the partially determinized automaton occurs without fully determinizing the automaton.

12. The method of claim 8, wherein the creating additional states in the partially determinized automaton further comprises creating new transitions that connect previous states in the partially determinized automaton with the additional states, wherein the creating the new transitions depends on the different subset of state pairs and the automaton, wherein each state pair in the different subset of state pairs includes a state of the automaton and a remainder weight.

13. The method of claim 8, wherein the partially determinizing the automaton during the search for the N-best distinct strings comprises determinizing only a portion of the automaton visited during the search for the N-best strings.

14. The method of claim 8, wherein the partially determinizing the automaton during a search for the N-best distinct strings further comprises:
creating subsets of state pairs for each state of the partially determinized automaton, wherein each state pair in each of the subsets of state pairs includes a state of the automaton and a remainder weight; and
assigning a weight to a final state of the partially determinized automaton.

15. The method of claim 8, further comprising terminating the search for the N-best strings when a final state of the result of determinization has been extracted N times.

16. The method of claim 8, further comprising prioritizing state pairs in each of the subsets of state pairs according to a determinized potential.

17. A method of partially determinizing an input weighted automaton to identify the N-best strings of the input weighted automaton where the input weighted automaton comprises input states and input transitions, wherein the input transitions interconnect the input states to form a plurality of complete paths from any one member of a set of beginning input states to any one member of a set of final input states, wherein each of the input transitions comprises a label and a weight, the method comprising:
creating a deterministic automaton, via a speech recognition system, by:
forming determinized states and determinized transitions in an order dictated by an N-shortest paths algorithm to create N complete paths using only a part of the input weighted automaton; and
interconnecting the determinized states and determinized transitions to form complete paths;
removing redundant paths; and
identifying the N-best strings of the input weighted automaton by searching for the N-best complete paths of the deterministic automaton, wherein the N-best complete paths comprise more than one best complete path, wherein the identifying the N-best strings comprises:
adding an initial state to the deterministic automaton;
creating an initialized first queue pair comprising the initial state and an initial cost element;
placing the first queue pair in a queue;
creating a plurality of new states from the first queue pair;
applying a shortest path algorithm to each of the new states to calculate a shortest path of each of the new states;
creating new queue pairs using the new states and cost elements of each new queue pair calculated via the shortest path algorithm;
adding the new queue pairs to the queue;
prioritizing the queue based upon a cost element of each queue pair relative to each other queue pair in the queue, wherein a queue pair in the queue with a lower cost element is given a higher priority than a queue pair in the queue with a higher cost element;
selecting a queue pair from the queue with a highest priority;
incrementing a pair counter; and
determining whether a value of the pair counter is equal to a desired number of best paths.

18. The method of claim 17, wherein the deterministic automaton represents a word lattice.

19. The method of claim 17, wherein each of the determinized transitions has a weight that corresponds to a probability.

20. The method of claim 17, further comprising computing potentials for each of the input states of the input weighted automaton prior to the creating.

* * * * *